July 4, 1950 — T. IAVELLI — 2,513,801
TRANSMISSION CONTROL
Filed Oct. 11, 1946 — 2 Sheets-Sheet 1

INVENTOR.
Teno Iavelli,
BY
Harness and Harris
ATTORNEYS.

July 4, 1950  T. IAVELLI  2,513,801
TRANSMISSION CONTROL

Filed Oct. 11, 1946  2 Sheets-Sheet 2

INVENTOR.
Temo Iavelli.
BY
Harness and Harris
ATTORNEYS.

Patented July 4, 1950

2,513,801

UNITED STATES PATENT OFFICE 2,513,801

TRANSMISSION CONTROL

Teno Iavelli, Detroit, Mich., assignor to Chrysler Corporation, Highland Park, Mich., a corporation of Delaware Application October 11, 1946, Serial No. 702,739

8 Claims. (Cl. 74—472)

This invention relates to motor vehicles and refers more particularly to power transmission and control mechanism therefor.

My invention has particular reference to transmission systems in which the torque load is relieved as by momentary interruption of the engine ignition system in order to unload positively engageable drive control elements so as to facilitate disengagement of such elements. One example of such a transmission is described and claimed in the copending application of Carl A. Neracher et al., Serial No. 335,310, filed May 15, 1940, now Patent No. 2,455,943, dated December 14, 1948. In such transmission systems it is now customary to provide a kickdown control on transmission downshift accompanied by ignition interruption such that when the accelerator pedal is depressed to the limit of its travel in throttle-opening direction then the downshift will automatically take place so as to accelerate the vehicle in a more favorable drive ratio as in passing another vehicle or in climbing a steep grade. It is also customary to provide a vehicle speed responsive control on both upshift and downshift in the transmission. The upshift control sets the transmission for a faster drive or step-up to occur at or above a predetermined vehicle speed and the vehicle speed responsive control on transmission downshift is accompanied by ignition interruption such that when the vehicle is brought to a temporary stop the transmission will be automatically stepped down and thus be set for acceleration from rest, known as "break-away," in a favorable torque multiplying gear ratio.

In the control for effecting the downshift, either by the accelerator kickdown or by the governor, it is now customary to provide an ignition control switch which is so operated as to normally effect a momentary interruption of the ignition system. Some part of the transmission downshift mechanism functions as a switch operator and is usually operably associated with the ignition control switch so that, with the drive control elements remaining in their relatively engaged relationship under load, such switch operating part will move sufficiently to operate the ignition control switch to interrupt the engine ignition. Then, normally, such switch operating part continues its movement along with a disengaging movement of one of the drive control elements so as to restore the ignition system to normal operation. Such arrangement incorporates a lost motion mechanism or gap between such switch operating part and the operating means for the movable drive control element, this gap permitting the ignition control switch to be operated in advance of disengaging movement of the movable drive control element and thus prepare the system for downshift under torque unloaded condition.

In actual use, transmission control systems of the aforesaid type sometimes fail to function as intended and the movable drive control element will fail to disengage after the ignition system has been interrupted. Such failure in the normal operation of the downshift may occur as the result of sticky oil, slight misalignment of parts, or for other reasons and produces a permanent grounding of the engine such that the car must be towed to a service station for investigation and correction of the failure.

It is an object of my invention to provide a control system which will prevent an occurrence of the aforesaid difficulty and failure such that the torque relieving means, preferably in the form of an ignition interrupting system, will always complete its cycle so as to only momentarily relieve the torque.

A further object is to insure restoration of the ignition system automatically when, for any reason, the movable drive control element fails to effect its downshift such that, but for my invention, the engine ignition would be permanently rendered inoperative.

Another object is to provide a transmission downshift system which is capable of operating under normal conditions in a conventional manner in effecting momentary interruption of the ignition system but which, in the event of tendency to unduly prolong the period of ignition interruption, will automatically come into action to restore the engine ignition.

Further objects and advantages of my invention will be apparent from the following description of one embodiment thereof which is illustrative of the principles of my invention, reference being had to the accompanying drawings in which.

Figure 1:
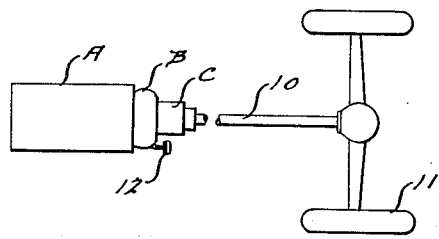
Fig. 1 is a diagrammatic top plan view of my power transmission applied to a motor vehicle.

In Fig. 1 the motor vehicle is of any desired type, that illustrated being of standard practice wherein an engine A transmits its drive through a propeller shaft 10 to drive the rear ground wheels 11. A fluid coupling and main friction clutch of known type and as illustrated in said copending application may be provided within the housing B, the clutch being releasable to uncouple the engine from the transmission by a conventional clutch pedal 12. Rearwardly of housing B is the transmission C of any type incorporating positively engageable drive control elements which resist relative disengagement when under substantial torque load thereby making the use of some form of torque unloading means desirable as an incident to transmission stepdown by release of the torque loaded drive control elements.

The illustrated transmission C is that more fully shown in said copending application and is of the underdrive type although other types including overdrive transmissions of known commercial form may be employed if desired. This transmission C comprises an input pinion 13 carrying clutch teeth 14 and a friction cone 15 constantly engaged by a blocker 16 carrying blocker teeth 17 adapted to be engaged by the teeth 18 of a clutch sleeve D when the latter is biased forwardly under asynchronous conditions in the rotation of pinion 13 and sleeve D. This sleeve together with clutch teeth 14 comprise relatively movable drive control elements for effecting stepup and step-down manipulation of the transmission.

Blocker 16 is lightly urged against the cone 15 by a spring 19 and has a lost-motion drive connection at 20 with the slotted end of a hub 21 of a high speed gear 22 such that the blocker may move relative to sleeve D between two positions blocking the sleeve, such positions being known as drive block and coast block depending on whether pinion 13 appreciably leads or lags the speed of the sleeve. The sleeve D is splined on hub 21 at 23, the arrangement being such that whenever sleeve D is rotating faster or slower than pinion 13 then the blocker teeth 17 will be aligned with the ends of the teeth of sleeve D and thus prevent shift of the sleeve into contact with teeth 14. However, when the pinion 13 is rotating faster than sleeve D and gear 22 and the sleeve is biased forwardly into blocked position, the driver may release the accelerator pedal to cause the engine and pinion 13 to slow down and as the pinion and sleeve pass through a synchronous relationship the blocker is moved from its drive blocking position toward its coast blocking position and when mid-way will unblock the sleeve and allow teeth 18 to pass between the blocker teeth and clutch with teeth 14. This mechanism is now well known commercially.

Gear 22 is loose on the output shaft 24 whereas pinion 13 is a part of the input shaft 25. Loose on the output shaft is a low speed gear 26 and a manually shiftable clutch E, which has a splined connection with a hub 27 fixed to shaft 24, and has associated therewith any commercial type of blocker synchronizers 28 such that clutch E may be shifted either forwardly to high range or rearwardly to low range to synchronously clutch shaft 24 either with the high speed gear 22 at the teeth 29 or with the low speed gear 26 at the teeth 30. Manual shifts of clutch E are facilitated by release of the main clutch at B by reason of the usual clutch pedal 12.

Pinion 13 has constant mesh with a countershaft gear 31 operating through an overrunning clutch F to drive the countershaft cluster 32 comprising gears 33 and 34 respectively in constant mesh with gears 22 and 26. For reverse an idler gear (not shown) having constant mesh with gear 34 is shifted rearwardly to mesh with gear 35 fixed on shaft 24, clutch E being maintained in its illustrated neutral condition.

When clutch E is shifted rearward to clutch gear 26 to shaft 24, then an overrunning relatively slow speed low range drive or first speed is transmitted from shaft 25 to shaft 24 by way of gear 31, overrunning clutch F, and gears 34 and 26. If at such time sleeve D is biased forward into drive block condition and the shaft 25 allowed to coast down by overrunning release of clutch F, then when teeth 14 are thus synchronized with sleeve D the latter, as aforesaid, will be unblocked and will clutch with teeth 14 to effect a step-up in the transmission during coasting conditions so that now a two-way relatively fast speed low range drive or second speed is effected from shaft 25 through sleeve D to gear 22 thence by way of gears 33, 34, and 26 and through clutch E to shaft 24, clutch F overrunning.

If clutch E is shifted forwardly to clutch gear 22 to shaft 24 then an overrunning relatively slow speed high range drive or third speed is transmitted from shaft 25 to shaft 24 by way of gear 31, overrunning clutch F, gears 33 and 22 thence through clutch E to shaft 24. In the same manner as aforesaid in connection with step-up from first to second, sleeve D may be clutched under coast synchronous conditions with teeth 14 to effect a two-way relatively fast speed high range drive or direct fourth of a speed ratio of 1 to 1 from shaft 25 directly through sleeve D and clutch E to shaft 24, clutch F overrunning.

Speed responsive means is provided to control forward bias of sleeve D as well as rearward bias thereof as will presently be more apparent. Furthermore, during drive in either second or fourth, a downshift to first or third respectively may be effected under control of the driver preferably by a full depression of the accelerator.

Figure 3:
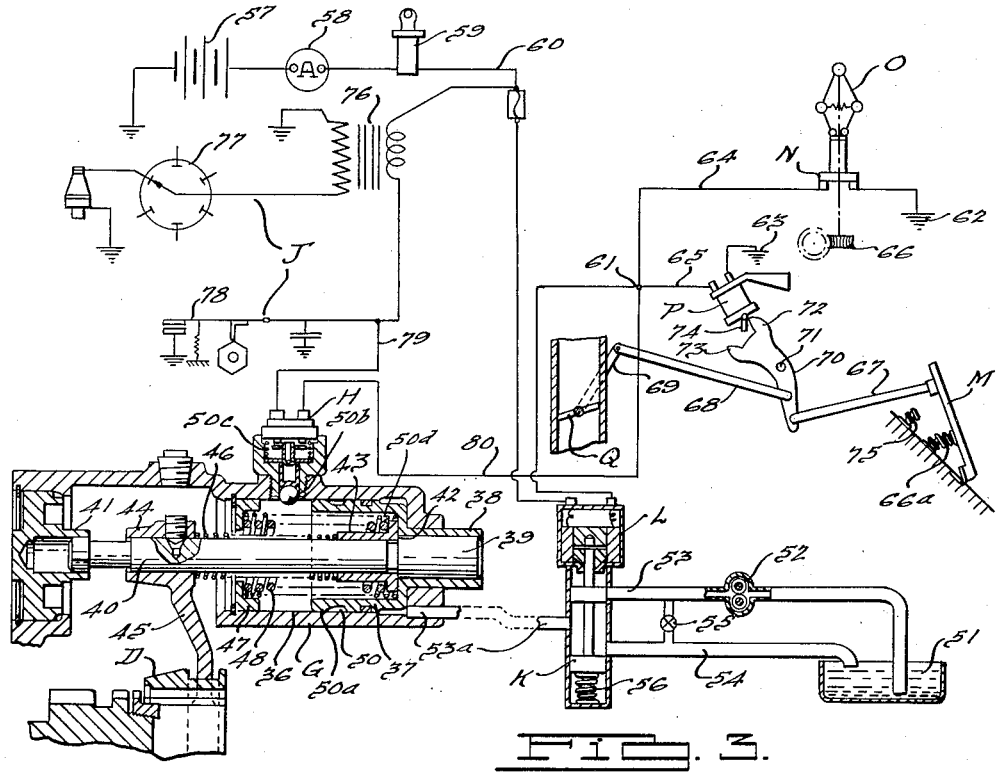
Fig. 3 is a diagrammatic view illustrating my control system.

Referring now to Fig. 3, I have provided a servo means of any suitable type, that illustrated being in the form of a fluid motor G for controlling shift of sleeve D. This motor comprises a cylinder 36 slidably receiving the differential pressure operated piston 37 formed with a rearwardly extending tubular part 38 slidable in the rear wall of the motor casing. Slidably fitting within the tubular part 38 is the rearwardly enlarged end portion 39 of a transmission shift rod 40 having its forward end slidably mounted in the fixed guideway 41. The enlarged rod portion 39 defines at its juncture with the rod 40 a stop in the form of an annular shoulder 42 which provides a blocker or seat for the flanged end portion of a spring seating piston actuating member 43 slidably fitting rod 40. With the parts in their Fig. 3 positions of downshift, the member 43 is seated on shoulder 42 and also on the end wall of piston 37, the latter engaging the rear wall of the casing. Fixed to the rod 40 is the collar 44 of a yoke 45 operably connected with sleeve D to effect shift thereof.

A relatively small force preloaded engaging spring 46 is disposed between the forward end of the member 43 and yoke 45 and thus provides a lost-motion thrust transmitting connection between piston 37 and sleeve D such that the piston may move forwardly or to the left for its power stroke in advance of the full clutching shift of sleeve D which is thereby biased toward its positive engagement with teeth 14. This forward stroke of the piston is limited as viewed in Fig. 4 by engagement of the piston with a second spring seating member 47 which is fixed within cylinder 36 and through which the rod 40 and spring 46 extend. The forward stroke of rod 40 is limited by engagement of yoke 44 with the guideway 41.

Figure 4:
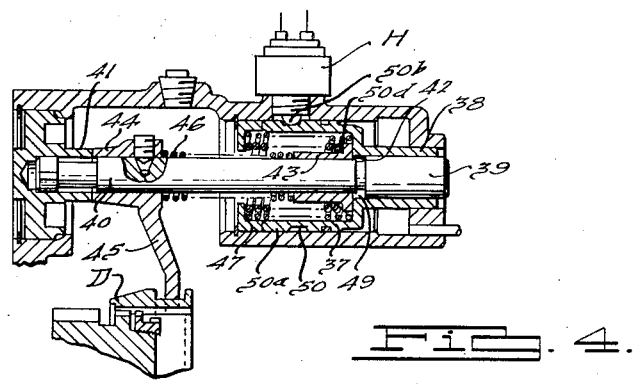
Fig. 4 is a view of a portion of the Fig. 3 control system showing the drive control elements and operating parts therefor in their positions of transmission upshift preparatory for downshift.

Surrounding spring 46 is a relatively large force preloaded kickdown or return spring 48 disposed between the members 43 and 47 and serves normally to return the piston 37, rod 40, and sleeve D from their Fig. 4 positions back to their Fig. 3 positions. The spring 46 is thus adapted to effect disengaging bias of sleeve D relative to teeth 14.

The forward stroke of piston 37 and member 43 is somewhat in excess of that of the rod 40 and sleeve D so that when the parts move from their Fig. 3 positions to their Fig. 4 positions a gap 49 is formed between shoulder 42 and member 43 equal to the difference between these strokes. This gap relationship is utilized to effect operation of an ignition control switch H for interrupting the engine ignition system J.

Piston 37 is provided with an annular groove 50 formed in its skirt to define a cam portion 50a which operates the ball actuator 50b for closing switch H which, in Fig. 3, is biased open by a spring 50c. A relatively light force preloaded spring 50d has its axis concentric with that of springs 46 and 48 and surrounds these springs with its opposite ends respectively seated on member 47 and piston 37. The spring 50d is of sufficient force to return piston 37 to its Fig. 3 position independently of spring 48 in the event that rod 40 remains in its Fig. 4 position or some position between its Fig. 4 and Fig. 3 positions when a downshift is called for by the transmission control system.

The pressure fluid supply system has been diagrammatically represented in Fig. 3 and comprises a suitable supply 51 of oil which is usually at the tranmission sump. A pump 52, preferably driven by the transmission output shaft 24, draws the oil from the supply 51 for delivery under pressure through pipe 53 thence to a passage 53a leading to the cylinder 36 at a point behind the piston 37. Communication of passage 53a with passage 53 is under control of a valve K which, when raised, establishes this communication and at the same time closes off the Fig. 3 communication of passage 53a with the return drain pipe 54. A pressure relief valve 55 by-passes the valve K so that when valve K is in its Fig. 3 venting position for the motor G, the pressure fluid delivered by the pump is returned to the supply 51 and also functions to maintain a predetermined desired pressure in the passage 53a when the valve is raised by its spring 56.

In Fig. 3 the valve K is shown lowered by operation of a solenoid L which is electrically energized to lower the valve against the force of the return spring 56 and to maintain the valve in such position.

Energization and de-energization of solenoid L is brought about by operation from one position to another of either of two control members respectively actuated or controlled by vehicle speed and by the driver. Electrical circuit means for this purpose includes a grounded storage battery 57 for supply of electrical energy through ammeter 58 and ignition switch 59 to a wire 60 thence through solenoid L to a terminal 61 whence either of two parallel grounds 62 or 63 will complete a circuit to energize solenoid L through wires 64 or 65, respectively. In Fig. 3 the solenoid is energized by the circuit which grounds the terminal 61 through wire 64 at 62 through a closed governor switch N.

This governor switch N constitutes one of the two aforesaid control members for solenoid L and is opened at predetermined vehicle speed under control of a governor O driven at 66 at some suitable point which operates at a speed proportionate to vehicle speed such as at the transmission countershaft or from driven shaft 24 if desired.

The other parallel circuit for grounding terminal 61 at 63 is controlled by a kickdown switch P which is open in Fig. 3 as accelerator M is released under control of its return spring 66a. The accelerator thus constitutes the other of the two aforesaid control members for solenoid L and is suitably connected by well known means with the usual engine carburetor throttle valve Q by linkage 67, 68, which serves to adjust the throttle lever 69 and thus open and close the throttle valve. In Fig. 3 the throttle valve Q is closed for engine idling. Interposed in the throttle operating linkage is a lever 70 pivotally supported at 71 and having spaced fingers 72, 73 for operating the switch finger 74 of the snap-type switch P. The arrangement is such that as the throttle valve approaches its wide open position by depressing accelerator M, finger 73 is engaged with switch finger 74 so that switch P is closed with snap action during approximately the last 5° or so of throttle opening movement.

If desired a pick-up spring 75 may be located at a suitable point in the throttle operating mechanism such that it imposes a yielding load on the accelerator pedal M, in addition to the return spring 66a, at the time when the pedal moves to close switch P. The driver will not thus accidentally close switch P at the end of the pedal stroke as a noticeable further effort is required to depress the accelerator for the kickdown final depression of the pedal. When the accelerator is then released the finger 72 operates to open the switch near the fully released position of the accelerator.

The ignition system J is conventional and includes coil 76, distributor 77, and breaker 78. From the primary side of the coil an ignition grounding line extends by wire 79 through the interrupter switch H thence by wire 80 to the terminal 61 for grounding under control of switches N or P at either 62 or 63.

In operation with the parts arranged as in Fig. 3 the engine is idling with the accelerator M fully released and the throttle valve Q in its fully closed position thereby opening the kickdown switch P. Transmission C is in neutral and with the vehicle at standstill the governor switch N is closed thus effecting energization of solenoid L to vent motor G to maintain sleeve D released as shown. Interrupter switch H is open as the ball actuator 50b is free of the piston 37.

For an ordinary forward drive, the operator shifts the sleeve E forwardly to high range and by depressing the accelerator pedal the vehicle is driven in third up to any desired speed. At some predetermined speed of vehicle travel, as for example around 10 miles per hour or higher or lower as desired, governor O operates to open switch N. This de-energizes solenoid L whereupon valve K operates by its spring 56 to open pressure fluid pipe 53 to passage 53a. Piston 37 then moves forwardly for its full stroke limited by abutment 47 further compressing springs 46, 48, and 50d and momentarily closing switch H which however does not interrupt the ignition because switch N is open. When the piston is at the end of its forward stroke switch H is open as the ball 50b is then aligned with the piston groove 50.

When piston 37 moves forwardly spring 46 operates to move rod 40 and sleeve D forwardly only until sleeve D comes up to its drive blocked position where it remains until the driver releases the accelerator pedal for the upshift to fourth by allowing the engine to slow down sufficiently to synchronize the speeds of teeth 14 and sleeve D to effect unblocking action of the blocker 16. The drive then takes place in the cruising fourth or direct drive.

Downshift from fourth back to third is effected either by closing the kickdown switch P or by closing governor switch N. Thus when the driver desires to effect the downshift from fourth he fully depresses the accelerator M to close switch P and inasmuch as the engine is delivering its full power at the attendant wide open throttle, it is desired to effect torque relief at the teeth 14, 18 to facilitate the release of sleeve D for the downshift. Therefore, when switch P is closed this not only energizes solenoid L to vent motor G but also concidentally affords a ground for the ignition wire 80 as soon as switch H is closed. When motor G is vented, piston 37 moves rearwardly from its Fig. 4 position a small amount independently of sleeve D under the force of spring 48 in taking up the aforesaid gap 49 until the member 43 engages the rod shoulder 42. When the piston moves to take up the gap, cam 50a closes the switch H to interrupt the ignition system J at ground 63 as switch P is then closed. This instantly unloads the torque at the teeth of sleeve D whereupon normally the piston 37 completes its rearward or return stroke back to the Fig. 3 position moving with it, because of member 43 and shoulder 42, the rod 40 and sleeve D as a unit. As soon as the sleeve clears the teeth 14 the ignition is restored to normal operation because ball 50b clears the cam 50a. When the accelerator M is released then fourth is again restored as aforesaid provided the vehicle speed is still such that switch N is open. If desired, any well known form of upper limit control on the accelerator kickdown may be provided so that, above a predetermined relatively high vehicle speed, the accelerator downshift is rendered inoperative.

If for any reason the sleeve D or rail 40 should stick in their Fig. 4 positions or should fail to fully return to their Fig. 3 positions, my invention provides an automatically operating system whereby the ignition control switch H is nevertheless so operated as to restore the ignition system to normal operation. Thus, assuming for example that sleeve D should fail in its normal functioning to move rearwardly when, after motor G is vented, the member 43 moves from its Fig. 4 position into engagement with shoulder 42. Spring 50d will then nevertheless operate to move the piston 37 back to its Fig. 3 position and thereby effect an opening of switch H so as to restore the engine to normal operation. With my invention the vehicle may be driven without danger of the engine being rendered permanently inoperative. Usually, with the engine and vehicle running, the sleeve D will work itself free to restore the normal operation but even if sleeve D fails to work free of teeth 14 the vehicle may still be driven selectively in second, fourth, and reverse speeds until the transmission can be serviced to remedy the defect.

In practice the spring 50d may be of such relatively light force that under normal conditions the spring 48 will determine the rate of movement of the piston 37 from its Fig. 4 position to its Fig. 3 position, spring 50d moving the piston rearwardly away from member 43 only in the event that shoulder 42 prevents the member 43 from moving the piston rearwardly. Spring 50d thus comes into action independently of springs 46 and 48 in insuring restoration of the ignition when there is any tendency of sleeve D to stick in any position between its Fig. 4 position of engagement with teeth 14 and its fully disengaged or initial position of Fig. 3.

For the other downshift from fourth to third under control of the vehicle speed it is only necessary to reduce the vehicle speed to or below the speed at which governor switch N closes. This energizes solenoid L and motor G effects the downshift just as outlined in connection with the closing of kickdown switch P. Furthermore, spring 50d will operate to return the piston and restore the ignition system under the same conditions as set forth above in connection with the downshift under control of switch P.

Figure 2:
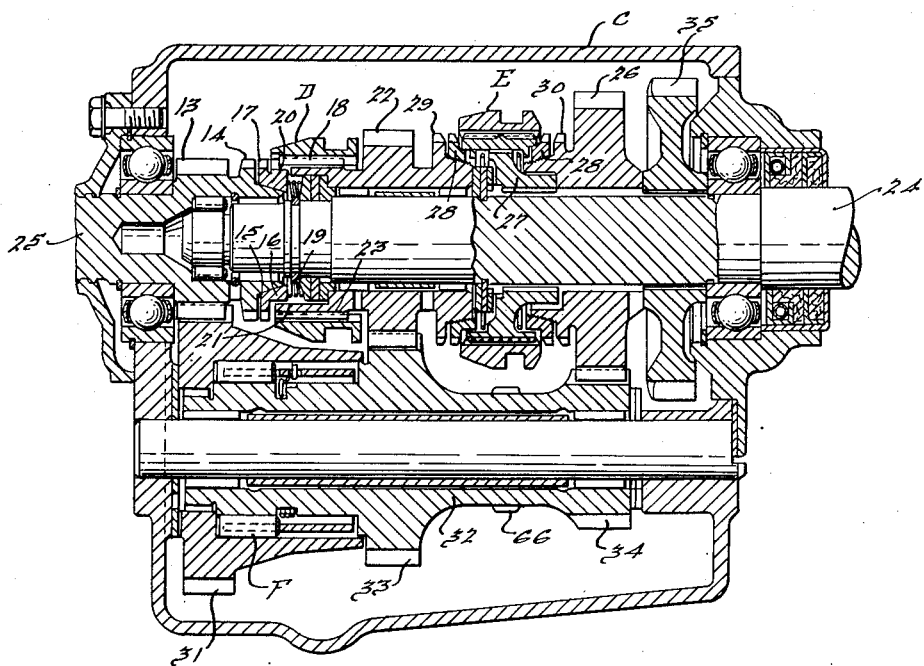
Fig. 2 is a sectional elevational view of a typical transmission to which my invention is applied for illustrative purposes.

When clutch E is in its rearward low range position, then the upshift and downshift under control of sleeve D will be just as set forth in connection with the corresponding functions occurring for the high range setting including the same functions of the spring 50d in returning the piston independently of the spring 48 and sleeve D. However, if governor O is driven from the countershaft, as at 66 in Fig. 2, then the governor O will function at somewhat lower car speeds depending on the gear ratios for first and second compared with third and fourth as will be readily understood.

I claim:

1. In a power transmission for driving a vehicle having an engine provided with an ignition system, a rotatable driving shaft adapted to receive drive from the engine, a rotatable driven shaft adapted to transmit drive from the driving shaft for driving the vehicle, means including relatively movable positively interengageable drive control elements providing a speed ratio drive relationship between said shafts, means providing another speed ratio drive relationship between said shafts when one of said drive control elements is moved out of interengaged relationship with respect to the other, servo-motor means comprising a power element adapted upon energization of said motor means for movement from a first position to a second position, means for controlling operation of said motor means, a transmission shift member connected for movement with said one drive control element from a first position to a second position and having a stop portion, an actuating member disposed in thrust transmitting relationship with said stop and with a portion of said power element, an engaging spring operably interposed between said actuating member and said transmission shift member and adapted, in response to movement of said power element from its said first position to its said second position, to yieldingly bias said transmission shift member in a direction for effecting said interengagement of said one drive control element with the other, said actuating member being so disposed with respect to said stop portion of said transmission shift member that, when said power element moves from its said first position to its said second position in effecting said interengagement of said drive control elements, said actuating member is thereby operated away from said stop portion to provide a gap relationship therewith, a return spring disposed in thrust transmitting relationship with said actuating member and adapted, upon deenergization of said motor means, to initially move said power element for a portion of its return movement through said actuating member until the latter moves through said gap and into said thrust transmitting relationship with said stop, and then, in the normal operation of the parts, to pick up said transmission shift member and effect return movement of said one drive control element to its said first position accompanied by further return movement of said power element to its said first position, means operable to effect a momentary cutting out of the normal operation of said ignition system thereby to unload said drive control elements and hence facilitate said return movement of said one drive control element, said ignition cut out means including an ignition controlling switch and means for effecting operation of this switch in response to predetermined movement of said power element, said ignition cut out means, including said ignition controlling switch and said switch operating means, being so constructed and arranged to effect a cut out of said ignition system in response to said initial return movement of said power element and to effect restoration of the normal operation of said ignition system in response to said further return movement of said power element, and a third spring biasing said power element toward its said first position independently of said actuating member and the aforesaid springs such that, upon failure of said actuating member and said return spring to function normally to effect said return movement of said one drive control element and said further return movement of said power element and restoration of said ignition system, said third spring will operate to effect said further return movement of said power element and thus effect said restoration of said ignition system.

2. In a power transmission for driving a vehicle having an engine provided with an ignition system, a rotatable driving shaft adapted to receive drive from the engine, a rotatable driven shaft adapted to transmit drive from the driving shaft for driving the vehicle, means including relatively movable positively interengageable drive control elements providing a speed ratio drive relationship between said shafts, means providing another speed ratio drive relationship between said shafts when one of said drive control elements is moved out of interengaged relationship with respect to the other, a fluid operated motor comprising a differential pressure operated power element adapted, upon differential pressure operation thereof, for movement from a first position to a second position, means for controlling said motor to effect a differential pressure operation and venting thereof, a transmission shift rod mounted for reciprocatory movement coaxially with said power element and connected for movement with said one drive control element from a first position to a second position and having an abutment portion, an actuating member carried by said rod and disposed in thrust transmitting relationship with said abutment and with a portion of said power element, an engaging spring surrounding said rod and having one end biasing said actuating member toward said abutment and the other end operably reacting through said rod, said engaging spring being adapted, in response to movement of said power element from its said first position to its said second position, to yieldingly operate said transmission shift rod in a direction for effecting said interengagement of said one drive control element with the other by moving said one drive control element from a first position thereof to a second position, said actuating member being so disposed with respect to said power element and abutment that, when said power element moves from its said first position to its said second position, said actuating member is thereby operated away from said abutment to provide a gap therebetween, a return spring surrounding a portion of said rod and disposed in thrust transmitting relationship with said actuating member and adapted, upon venting said motor, to effect firstly a partial return movement of said power element toward its said first position defined by movement of said actuating member through said gap and into said thrust transmitting relationship with said abutment, and secondly, in the normal operation of the parts, to effect return movement of said rod and said one drive control element to their said first positions accompanied by completion of the return movement of said power element to its said first position, means operable to effect a momentary interruption in the normal operation of said ignition system thereby to unload said drive control elements and facilitate said return movement of said one drive control element to its said first position, said ignition interrupting means including an ignition interrupting switch and means for effecting operation of the same in response to movement of said power element, said ignition interrupting means, including said ignition interrupting switch and said switch operating means, being so constructed and arranged as to effect an interruption of said ignition system in response to said partial return movement of said power element and then to effect restoration of the normal operation of said ignition system in response to said completion of the return movement of said power element, and a third spring surrounding a portion of said rod and disposed to bias said power element toward its said first position independently of said actuating member and the aforesaid springs, said third spring being adapted, upon failure of said actuating member and return spring to function normally to effect said return movement of said one drive control element and said completion of the return movement of said power element, to effect said completion of the return movement of said power element and thus effect said restoration of said ignition system.

3. In a power transmission for driving a vehicle having an engine provided with an ignition system, a rotatable driving shaft adapted to receive drive from the engine, a rotatable driven shaft adapted to transmit drive from the driving shaft for driving the vehicle, means including relatively movable positively interengageable drive control elements providing a speed ratio drive relationship between said shafts, means providing another speed ratio drive relationship between said shafts when one of said drive control elements is moved out of interengaged relationship with respect to the other, servo-motor means comprising a power element adapted, upon energization of said servo-motor means, to move for a power stroke between predetermined limits, means for controlling operation of said servo-motor means to effect energization and deenergization thereof, means providing an operating connection between said power element and said one drive control element for biasing the latter for a power stroke from a position of disengagement with respect to the other of said drive control elements toward a position of interengagement therewith in response to movement of said power element for its said power stroke, said operating connecting means comprising a part adapted to be moved by said power element and a part connected with said one drive control element and a thrust transmitting spring between said parts, a return spring operating through said first part to bias said power element for return movement thereof when said servomotor means is deenergized, means providing a lost motion operating connection between said parts so constructed and arranged, with respect to the aforesaid power strokes of said power element and said one drive control element, that the first of said parts overtravels the second of said parts when these elements are at the ends of their said power strokes, and abutment means carried by said second part so disposed as to receive thrust from said return spring for return movement of said second part, means responsive to return movement of said power element to interrupt and restore said ignition system during said return movement thereby to unload said drive control elements and facilitate the movement of said one drive control element out of interengaged relationship with respect to the other during the interval of interrupted ignition, and supplemental means biasing said power element for return movement thereof independently of said operating connecting means whereby upon failure of said operating connecting means to function normally to effect return of said power element and restoration of said ignition system said supplemental means will operate to effect said return movement of said power element and thus effect restoration of said ignition system.

4. In a power transmission for driving a vehicle having an engine provided with an ignition system, a rotatable driving shaft adapted to receive drive from the engine, a rotatable driven shaft adapted to transmit drive from the driving shaft for driving the vehicle, means including relatively movable positively interengageable drive control elements providing a speed ratio drive relationship between said shafts, means providing another speed ratio drive relationship between said shafts when one of said drive control elements is moved out of interengaged relationship with respect to the other, servo-motor means comprising a power element adapted upon energization of said motor means for movement from a first position to a second position, means for controlling operation of said motor means, a transmission shift member connected for movement with said one drive control element from a first position to a second position and having a stop portion, an actuating member disposed in thrust transmitting relationship with said stop and with a portion of said power element, an engaging spring operably interposed between said actuating member and said transmission shift member and adapted, in response to movement of said power element from its said first position to its said second position, to yieldingly bias said transmission shift member in a direction for effecting said interengagement of said one drive control element with the other, a return spring disposed in thrust transmitting relationship with said actuating member and adapted upon deenergization of said motor means, to move said power element and said actuating member to return said power element to its first position and adapted to pick up and return said transmission shift member by engagement of said actuating member with said stop portion thereby effecting return movement of said one drive control element to its said first position, means operable in response to said return movement of said power element to effect a momentary cutting out and restoration of the normal operation of said ignition system thereby to unload said drive control elements and hence facilitate said return movement of said one drive control element, and a third spring biasing said power element toward its said first position and away from said actuating member, whereby upon failure of said actuating member and said return spring to function normally to effect said return movement of said one drive control element and said return movement of said power element and restoration of said ignition system, said third spring will operate to separate said power element from said actuating member and effect the return of said power element and the restoration of said ignition system.

5. In a power transmission for driving a vehicle having an engine provided with an ignition system, a rotatable driving shaft adapted to receive drive from the engine, a rotatable driven shaft adapted to transmit drive from the driving shaft for driving the vehicle, means including relatively movable positively interengageable drive control elements providing a speed ratio drive relationship between said shafts, means providing another speed ratio drive relationship between said shafts when one of said drive control elements is moved out of interengaged relationship with respect to the other, servo-motor means comprising a power element adapted upon energization of said motor means for movement from a first position to a second position, means for controlling operation of said motor means, a transmission shift member connected for movement with said one drive control element from a first position to a second position and having a stop portion, an actuating member disposed in thrust transmitting relationship with said stop and with a portion of said power element, an engaging spring operably interposed between said second member and said transmission shift member and adapted, in response to movement of said power element from its said first position to its said second position, to yieldingly bias said transmission shift member in a direction for effecting said interengagement of said one drive control element with the other, a return spring disposed in thrust transmitting relationship with said actuating member and adapted upon deenergization of said motor means to move said element through said actuating member to return said power element to its first position and adapted to pick up and return said transmission shift member by engagement of said actuating member with said stop portion thereby effecting return movement of said one drive control element to its said first position, means operable in response to said return movement of said power element to effect a momentary cutting out and restoration of the normal operation of said ignition system thereby to unload said drive control elements and hence facilitate said return movement of said one drive control element, and a third spring biasing said power element toward its said first position and adapted to cause said power element to over-travel said actuating member upon deenergization of said motor means and upon failure of said actuating member and said return spring to function normally to return said power element to its first position and restore said ignition system.

6. In a power transmission for driving a vehicle having an engine provided with an ignition system, a rotatable driving shaft adapted to receive drive from the engine, a rotatable driven shaft adapted to transmit drive from the driving shaft for driving the vehicle, means including relatively movable positively interengagable drive control elements providing a speed ratio drive relationship between said shafts, means providing another speed ratio drive relationship between said shafts when one of said drive control elements is moved out of interengaged relationship with respect to the other, servo-motor means comprising a power element adapted upon energization of said motor means to move for a power stroke between predetermined limits, means for controlling operation of said servo-motor means to effect energization and deenergization thereof, means providing an operating connection between said power element and said one drive control element for biasing the latter for a power stroke from a position of disengagement with respect to the other of said drive control elements toward a position of interengagement therewith in response to movement of said power element for its said power stroke, said operating connecting means comprising an actuating member adapted to be moved by said power element, a transmission shift member and a thrust transmitting spring between said actuating member and said transmission shift member, a return spring operating through said actuating member to bias said power element for return movement thereof when said servo-motor means is deenergized and no longer controlling said power element, an abutment carried by said transmission shift member and so disposed as to receive thrust from said actuating member for return movement of said transmission shift member, means responsive to return movement of said power element to interrupt and restore said ignition system during said return movement thereby to unload said drive control elements and facilitate the movement of said one drive control element out of interengaged relationship with respect to the other during the interval of interrupted ignition and supplemental means biasing said power element for return movement thereof independently of said actuating member and said return spring whereby upon failure of said actuating member and said return spring to effect return of said power element and restoration of said ignition system said supplemental means will operate to effect said return movement of said power element and thus effect restoration of said ignition system.

7. In a drive for a motor vehicle having an engine; transmission mechanism operable to provide a drive from the engine to the vehicle, said mechanism including positively engageable drive-control elements one of which is movable into engaging relationship with the other to accommodate said drive and into disengaging relationship with respect to said other element to release said drive, said elements when relatively engaged being subject to thrust-application therebetween during said drive so as to resist relative disengagement thereof to release said drive until said thrust-application is relieved; an ignition system for said engine adapted to be interrupted to relieve said thrust-application; a switch operable to control said ignition system and adapted for operation from a first position accommodating operation of said ignition system to a second position interrupting said ignition system; a transmission shift member operable to move said movable drive-control element and adapted for movement from a first position accommodating a disengaging relationship of said elements to a second position causing said engaging relationship of said elements; a fluid operated motor comprising a differential pressure operated power element adapted, upon differential pressure operation thereof, for movement from a first position to a second position, said power element being operable to operate said switch from said first position to said second position and return to said first position as any incident to movement of said power element in either direction between its positions, means for controlling said motor to effect a differential pressure operation and venting thereof, a slidably mounted actuating member in abutting relationship with said power element, yielding means providing a lost motion thrust transmitting connection between said actuating member and said transmission shift member, said yielding means being adapted in response to movement of said power element and said actuating member from the said first position to the said second position of said power element to move said transmission shift member from its first position to its second position, means to move said transmission shift member, said actuating member and said power element from the second position toward the first position of said power element thereby to operate said switch from its first position to its second position and from its second position to its first position and supplemental means biasing said power element toward its first position independently of said transmission shift member and independently of said actuating member so that return of said power element to its first position and return of said switch to its first position is assured independently of movement of said transmission shift member and said actuating member.

8. In a power transmission for driving a vehicle having an engine provided with an ignition system, a rotatable driving shaft adapted to receive drive from the engine, a rotatable driven shaft adapted to transmit drive from the driving shaft for driving the vehicle, means including relatively movable positively interengageable drive control elements providing a speed ratio drive relationship between said shafts, means providing another speed ratio drive relationship between said shafts when one of said drive control elements is moved out of interengaged relationship with respect to the other, spring opposed pressure differential power means comprising a power element adapted upon energization of said power means for movement from a first position to a second position, means for controlling operation of said power means, a transmission shift member connected for movement with said one drive control element from a first position to a second position and having a stop portion, an actuating member disposed in thrust transmitting relationship with said stop and with a portion of said power element, said actuating member and said transmission shift member being slidably telescopically arranged with respect to each other, an engaging spring operably disposed between said actuating member and said transmission shift member and adapted in response to movement of said power element from its said first position to its said second position to yieldingly bias said transmission shift member in a direction for effecting said interengagement of said one drive control element with the other, a return spring disposed in thrust relationship with said actuating member and adapted upon deenergization of said pressure differential power means to move said power element and said actuating member to return said power element to its first position and adapted to pick up and return said transmission shift member by engagement of said actuating member with said stop portion thereby effecting return movement of said one drive control element to its said first position, means operable in response to said return movement of said power element to effect a momentary cutting out and restoration of the normal operation of said ignition system thereby to unload said drive control elements and hence facilitate said return movement of said one drive control element, and a third spring biasing said power element toward its said first position and away from said actuating member, whereby upon failure of said actuating member and said return spring to function normally to effect said return movement of said one drive control element, said return movement of said power element and restoration of said ignition system, said third spring will operate to separate said power element from said actuating member and effect the return of said power element and the restoration of said ignition system.

TENO IAVELLI.

REFERENCES CITED

The following references are of record in the file of this patent:

UNITED STATES PATENTS

| Number | Name | Date |
|---|---|---|
| 2,356,598 | Lang et al. | Aug. 22, 1944 |
| 2,425,889 | Matulaitis | Aug. 19, 1947 |